United States Statutory Invention Registration [19]

[11] Reg. Number: H739

Gutleber [43] Published: Feb. 6, 1990

[54] AUXILIARY ANTENNA INTERFERENCE CANCELLER

[75] Inventor: Frank S. Gutleber, Little Silver, N.J.

[73] Assignee: The United States of America as represented by the Secretary of the Army, Washington, D.C.

[21] Appl. No.: 374,123

[22] Filed: Jun. 13, 1989

[51] Int. Cl.[4] ..... G01S 3/16

[52] U.S. Cl. ..... 342/384; 342/368

*Primary Examiner*—Thomas H. Tarcza
*Assistant Examiner*—Linda J. Wallace
*Attorney, Agent, or Firm*—Michael J. Zelenka

[57] ABSTRACT

A high gain, primary receiving antenna and a single scannable auxiliary linear antenna array are utilized. The auxiliary linear array is coupled to means for forming multiple directive narrow receiving beams simultaneously on the auxiliary array, each of which are scanned over an assigned segment of space to locate and isolate a respective one of a plurality of interfering or jamming signals which are also contained in the signal received by the primary antenna. The interfering signals are cancelled by separately adjusting the phase and amplitude of each one of the interfering signals received and then feeding them to a respective signal subtractor coupled to the output of a receiver connected to the primary antenna.

10 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

AUXILIARY ANTENNA INTERFERENCE CANCELLER

This is a Statutory Invention Registration (SIR) application of an invention made by an employee of the U.S. Government, Department of the Army.

CROSS REFERENCE TO RELATED APPLICATION

This invention is related to the invention shown and described in U.S. SIR application Ser. No. 374,124 entitled, "Antenna Sidelobe Interference Canceller", filed by the same assignee in the name of the subject inventor on June 13, 1989.

FIELD OF THE INVENTION

This invention relates generally to electrical antenna systems and more particularly to an adaptive antenna system which enables undesired interference to be cancelled from incident radiation received by the antenna system.

BACKGROUND OF THE INVENTION

One of the major concerns of designers of antenna system communication links is the elimination or reduction of external interference sources such as jamming, self interference, atmospheric noise, man-made noise and acoustic noise. Generally, most approaches to resolve these problems do so in a relatively complex manner.

One known approach involves the use of an antenna configuration comprised of an omnidirectional antenna and a notch antenna at the receiving end of a transmission link to cancel interference arriving from all directions except over the narrow beamwidth notch or null formed by the notch antenna. By orthogonally combining the two antenna signals, all of the undesired interference is subtracted from the signal received by the omnidirectional antenna, leaving only the desired signal. Such a system is shown and described, for example, in U.S. Pat. No. 4,275,397, entitled, "Interference Cancelling Random Access Discrete Address Multiple Access System", which issued to Frank S. Gutleber, the present inventor, on June 23, 1981. A variation of this concept is further shown and described in U.S. Pat. No. 4,431,999, entitled, "Interference Cancelling System Using A Notch And Omnidirectional Antenna", which issued to Frank S. Gutleber on Feb. 14, 1984. Both of these patents are meant to be specifically incorporated herein by reference.

Accordingly, it is an object of the present invention to provide an improvement in antenna systems having an interference cancelling capability.

It is another object of the invention to provide an improvement in antenna systems having the capability of orthogonally separating and isolating a plurality of simultaneous interference sources and substantially cancelling the signals emanating therefrom.

It is a further object of the invention to provide an antenna system which can cancel or eliminate interference from multiple sources that are offset from antenna boresight and arrive in the sidelobe region or mainlobe of a large high gain antenna.

It is still another object of the invention to provide an antenna system which provides substantial anti-jam protection for transmission links that employ large high gain antennas such as used in tropospheric line of sight links and satellite ground terminals.

SUMMARY OF THE INVENTION

These and other objects are achieved by means of a high gain, primary receiving antenna and a single scannable auxiliary receiving antenna array coupled to means for forming multiple directive narrow receiving beams simultaneously on the auxiliary array, each of which are scanned over an assigned segment of space to locate and isolate a respective one of a plurality of interfering or jamming signals which are also contained in the signal received by the primary high gain antenna. The interfering signals are cancelled by separately adjusting the phase and amplitude of each one of the interfering signals received and then feeding them to a respective signal subtractor coupled to the output of a receiver connected to the primary antenna.

BRIEF DESCRIPTION OF THE DRAWINGS

These and other features of the present invention will become readily apparent when the following detailed description of the invention is considered with the accompanying drawing in which.

DETAILED DESCRIPTION OF THE INVENTION

Figure 1:
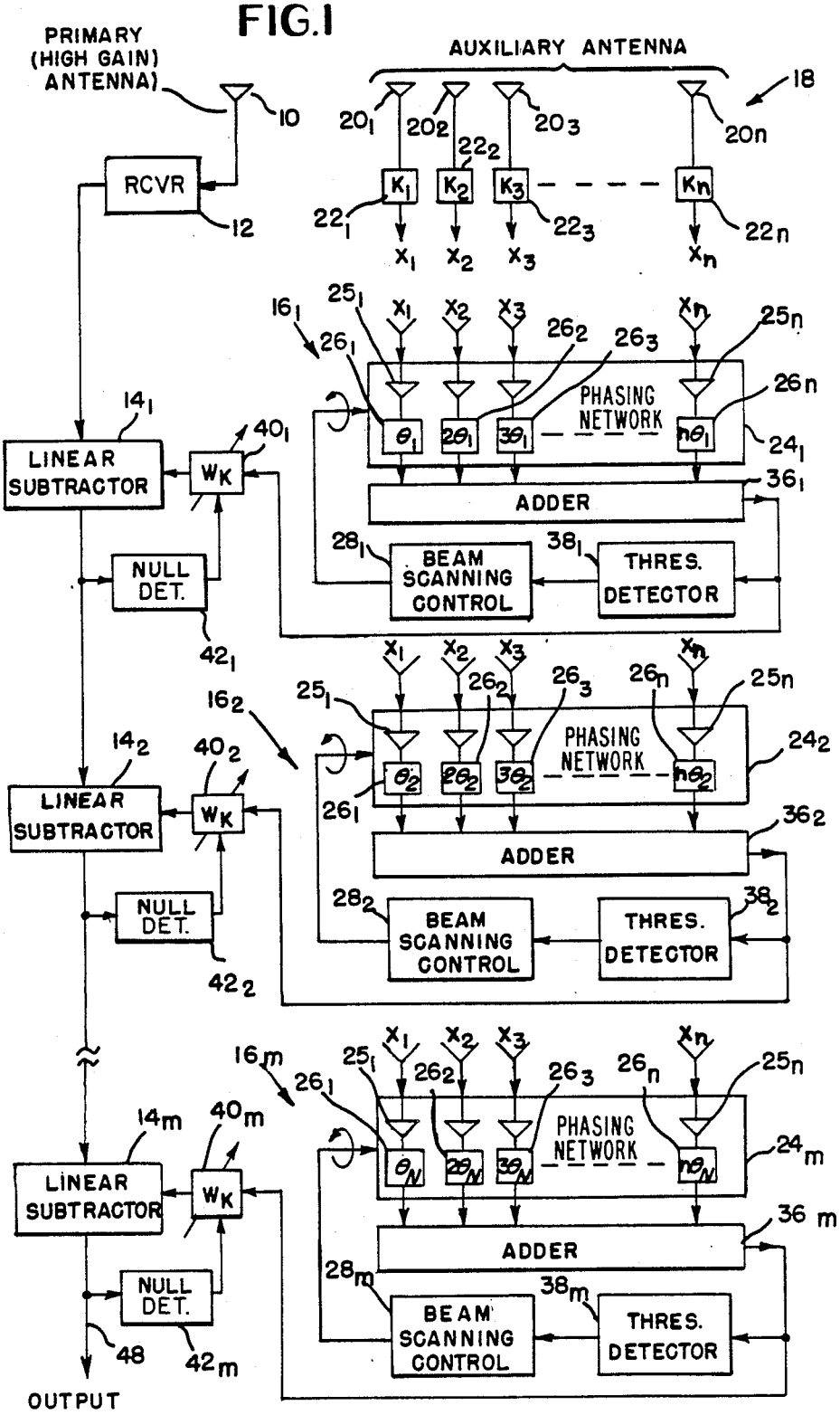
FIG. 1 is an electrical functional block diagram illustrative of the preferred embodiment of the invention.

Referring now to the drawings and more particularly to FIG. 1, reference numeral 10 denotes a relatively large, high gain primary receiving antenna shown coupled to a receiver 12 whose output is connected to a plurality of series coupled linear signal subtractors $\mathbf{14}_1$, $\mathbf{14}_2 \ldots \mathbf{14}_m$. The signal subtractors are coupled to a respective number of orthogonal signal cancelling loops $\mathbf{16}_1$, $\mathbf{16}_2 \ldots \mathbf{16}_m$, which are commonly connected to a multi-element auxiliary antenna array 18 shown comprised of n elements $\mathbf{20}_1$, $\mathbf{20}_2$, $\mathbf{20}_3 \ldots \mathbf{20}_n$ arranged, for example, in a linear array. Each of the antenna elements $\mathbf{20}_1 \ldots \mathbf{20}_n$ are further shown coupled to the respective operational signal blocks $\mathbf{22}_1$, $\mathbf{22}_2$, $\mathbf{22}_3 \ldots \mathbf{22}_n$, which are utilized to establish a predetermined amplitude and space taper for the auxiliary array 18.

The multiple element signal outputs from the auxiliary array 18, as shown by reference characters $x_1$, $x_2$, $x_3 \ldots x_n$, are commonly coupled to individual phasing networks $\mathbf{24}_1$, $\mathbf{24}_2 \ldots \mathbf{24}_m$ of the m number of signal cancelling loops $\mathbf{16}_1$, $\mathbf{16}_2 \ldots \mathbf{16}_m$. Each phasing network includes a number of signal isolation amplifiers $\mathbf{25}_1$, $\mathbf{25}_2$, $\mathbf{25}_3 \ldots \mathbf{25}_n$ and phase shifters $\mathbf{26}_1$, $\mathbf{26}_2$, $\mathbf{26}_3 \ldots \mathbf{26}_n$, equal in number to the n antenna elements and signals $x_1$, $x_2$, $x_3 \ldots x_n$ from the auxiliary array 18.

Each of the phase shifters $\mathbf{26}_1$, $\mathbf{26}_2$, $\mathbf{26}_3 \ldots \mathbf{26}_n$ in the phasing networks $\mathbf{24}_1 \ldots \mathbf{24}_n$ are individually adjusted by a respective beam scanning controller unit $\mathbf{28}_1$, $\mathbf{28}_2 \ldots \mathbf{28}_m$ so that the auxiliary antenna array 18 is scanned in a plurality of individual narrow directionally controlled beam patterns equal in number to the number of orthogonal cancelling loops utilized, i.e., m separate beams. Using phase shift adjustment of the elements in a linear array to obtain directivity is a well known technique and widely employed by practitioners in the art for space scanning an antenna array.

Figure 3:
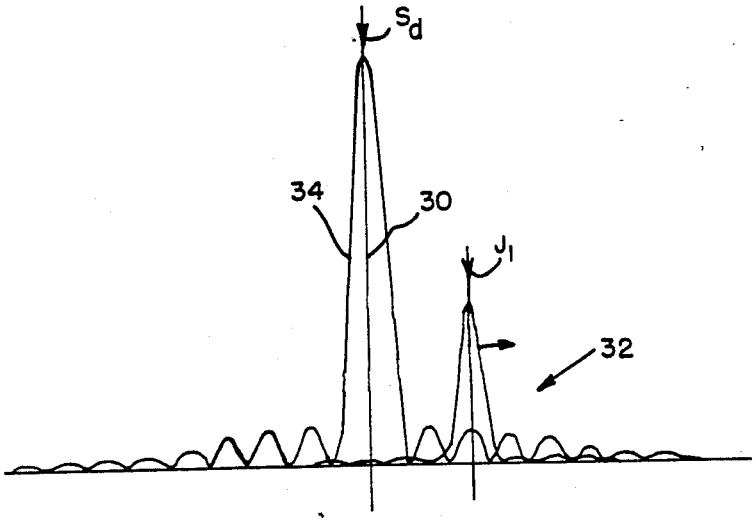
FIG. 3 is a diagram illustrative of the antenna patterns formed by the embodiment of the invention shown in FIG. 1.

Accordingly, each of the phasing networks $24_1$, $24_2$ . . . $24_m$ are utilized to locate and lock on to a specific single interference signal from any number of sources that are offset from boresight 30 of the primary antenna 10 as shown in FIG. 3 and arrive in the sidelobe region 32 or the mainlobe or beam 34 of the primary antenna 10. While electronic scanning is shown in FIG. 1, mechanical scanning techniques can be utilized, when desirable, as long as multiple directive narrow receiving beams are simultaneously formed and which can be scanned over an assigned space segment to locate and isolate a respective one of, for example, m interfering jamming signals.

FIG. 3, for example, shows a single jamming signal $J_i$ of many, not shown, which is incident at the sidelobe region 32 of the primary antenna 10 and being offset from boresight where a desired signal $S_d$ is being received. Elimination or cancellation of the interfering signal such as $J_i$ shown in FIG. 3, will now be considered, it being noted that the remaining identical signal cancelling loops include like elements and operate in the same fashion to cancel the respective signals received from other separate and distinct interfering sources.

Although not shown, means are employed to prevent the plurality of cancelling loops $16_1$, $16_2$ . . . $16_m$ from searching over the same angular space and tracking the same signal. Where, for example, the ith signal is tracked by the i=1 cancelling loop $16_1$, the output of the phase shifters $26_1$, $26_2$, $26_3$ . . . $26_n$ are summed in a signal adder $36_1$, whose output is fed to a threshold detector $38_1$, whose output in turn is used to control the beam scanning control unit $28_1$.

Figure 2:
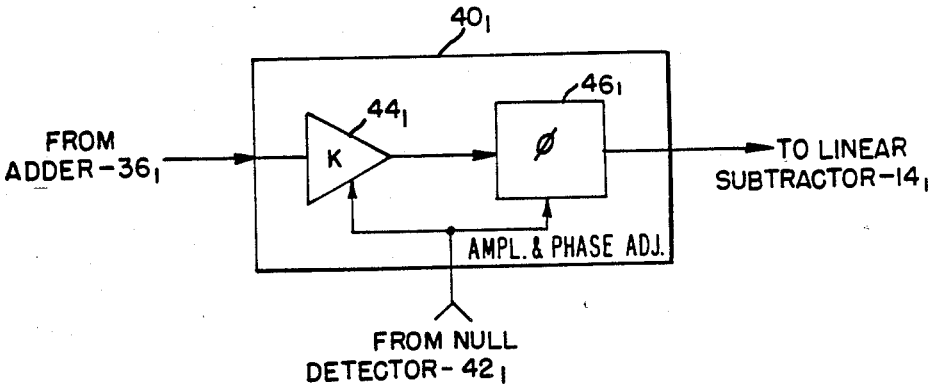
FIG. 2 is an electrical block diagram further illustrative of the variable amplitude and phase adjustment block shown in FIG. 1.

In operation, the beam scanning control unit $28_1$ varies the phasing of the individual phase shifters $26_1$, $26_2$, $26_3$ . . . $26_n$ in the phasing network $24_1$ until the signal adder outputs a level which equals or exceeds a predetermined threshold level, indicating alignment with the desired inerfering signal source. At this point the scanning of the received beam, implemented by the phase unit $24_1$, stops but continues to track the beam position in the direction of the interference source should it be moving. The output of the adder $36_1$ is coupled to the linear signal subtractor $14_1$ through an amplitude and phase adjusting functional block $40_1$ which is controlled by a null detector $42_1$. The functional block $40_1$ is further shown in FIG. 2 comprised of a voltage variable amplifier $44_1$ and a voltage variable phase shifter $46_1$. The amplitude and phase of the received interfering signal out of the adder $36_1$ is adjusted and fed to the linear subtractor $14_1$ until a null output is generated thereby and detected in the null detector $42_1$. Thus, the interfering signal $J_i$ is removed from the composite output signal of the receiver 12.

The other interfering signals sensed and tracked by the remaining cancelling loops $16_2$ . . . $16_m$, are removed by their respective linear subtractors $14_2$ . . . $14_m$ to provide an output signal on signal lead 48 which is substantially devoid of all the interfering signals which have been sensed and tracked by the cancelling loops $16_1$ . . . $16_m$ coupled to the auxiliary antenna array 18. Thus m cancelling loops $16_1$ . . . $16_m$ can cancel m interfering sources with each loop independently locating, isolating and subtracting a particular one of the interference signals.

The interference cancelling concept shown and described with respect to FIG. 1 is capable of providing a significant degree of protection against multiple sources of interference and jamming signals where the patterns of the auxiliary antenna generated by the phase shifters $24_1$, $24_2$ . . . $24_m$ have sidelobes down by a predetermined amount, such as 20 dB to 25 dB. The performance can be enhanced even more by using an auxiliary array antenna 18 having a design with relatively lower sidelobes. Near zero sidelobes would result in obtaining substantially complete isolation of all the individual interference sources and thus enable complete cancellation of all interference.

The sidelobe levels of the auxiliary antenna 18 results in some residual interference that would not necessarily be subtracted out in the linear subtractors $14_1$, $14_2$ . . . $14_m$. In the worse case, the residual interference level arriving in the sidelobes of the auxiliary antenna 18 would be down by the sum of the sidelobe levels of the primary antenna 10 plus the auxiliary antenna 18 for the sidelobes in which the interference is entering the system. Therefore, if the maximum sidelobe level of the primary and auxiliary antennas is 30 dB and 40 dB, respectively, then the maximum possible residual level from an interferror would be down by 70 dB from the level of the signal arriving in the main beam 34 of the primary antenna 10 as shown in FIG. 3. It should be noted, however, that the residual interference can be reduced still further by taking the output of any isolated interference and adjusting its amplitude and phase a second time by another functional block 40 to subtract the residual level of the same signal. An optimum design for a linear array such as realized with respect to the auxiliary antenna array 18, employs both a space and amplitude taper as provided by the circuit elements $22_1$, $22_2$, $22_3$ . . . $22_n$.

The implementation of the interference canceller as shown and described herein can be used to provide significant ECCM protection in any communications link that employs a high gain, narrow beamwidth antenna such as a LOS, Tropo, or Satellite link that operates in the SHF or EHF frequency band. The present invention can also be implemented as a modification to existing systems that employ a large high gain antenna and have a need for a substantial amount of anti-jam protection.

The invention is significant in that it has the capability of orthogonally separating and isolating the signals from many different interfering sources simultaneously and enabling them to be substantially completely cancelled. In addition, the response or acquisition time for the system such as shown in FIG. 1 would be extremely fast since the various cancellation loops $16_1$, $16_2$ . . . $16_m$ would be searching and processing various signal inputs to the system simultaneously. Furthermore, the processing does not involve complex or time consuming adaptive control algorithms such as the least mean square (LMS) or power inversion algorithms.

Having thus shown and described what is at present considered to be the preferred embodiment of the invention, it should be noted that the same has been made by way of illustration and not limitation. Accordingly, all modifications, alterations and changes coming within the spirit and scope of the invention as set forth in the appended claims are herein meant to be included.

I claim:

1. An interference cancelling system, comprising:

primary receiving antenna means including an output for providing a first output signal including a desired signal and all interfering signals;

steerable auxiliary receiving antenna means including means for simultaneously forming and scanning a plurality of relatively narrow receiving beams respectively directed to a predetermined number of individual sources of interfering signals for providing a respective number of second output signals; and means connected to the output of said primary antenna means and said auxiliary antenna means for subtracting said second output signals from said first output signal.

2. The system of claim 1 wherein said subtracting means includes means for subtracting each of said second output signals individually from said first output signal and generating control output signal.

3. The system of claim 2 and additionally including means for adjusting the amplitude and phase of said second output signals to match corresponding intefering signals in said first output signal from said primary antenna means.

4. The system of claim 3 and additionally including means for adjusting the amplitude and phase of said second output signals in response to the control output signal of said subtractor

5. The system of claim 4 wherein said means for adjusting the amplitude and phase of said second output signals comprises null detector means.

6. The system of claim 5 wherein said subtracting means includes a respective number of linear subtractor means connected in series for subtracting each of said second output signals individually from said first output signal.

7. The system of claim 2 wherein said auxiliary receiving antenna means comprises a linear array including a plurality of antenna elements.

8. The system of claim 7 wherein said means for forming and scanning a plurality of relatively narrow receiving beams includes a respective number of scanning control loops, each said control loop including: a phasing network for adjusting the phases of each said antenna element and providing intermediate output signals therefrom; signal adder means for summing said intermediate output signals; and beam scanning control means responsive to the summed intermediate output signals to control said phasing network to direct a receiving beam pattern to a selected source of interfering signals.

9. The system of claim 8 and additionally including a threshold detector coupled between each said signal adder and each said beam scanning control circuit.

10. The system of claim 9 and wherein each phasing network includes a respective phase shifter coupled to each antenna element of said auxiliary antenna means.

* * * * *